United States Patent [19]

Kim et al.

[11] Patent Number: 4,912,148

[45] Date of Patent: Mar. 27, 1990

[54] THERMOPLASTIC ELASTOMERIC RESIN COMPOSITIONS AND PROCESS FOR PREPARING THE SAME

[75] Inventors: Jae K. Kim, Anyang; Sung M. Lee, Seoul; Young D. Kim, Anyang, all of Rep. of Korea

[73] Assignee: Tong Yang Nylon Co., Ltd., Rep. of Korea

[21] Appl. No.: 219,577

[22] Filed: Jul. 15, 1988

[30] Foreign Application Priority Data

Jun. 21, 1988 [KR] Rep. of Korea .................. 88-7455

[51] Int. Cl.$^4$ .................. C08L 23/16; C08L 23/26; C08L 19/00
[52] U.S. Cl. .................. 524/487; 524/476; 524/484; 524/485; 524/526; 524/525; 524/518; 525/193; 525/194; 525/195; 525/211; 525/232; 525/237; 525/360; 525/387; 525/197
[58] Field of Search ............... 525/232, 193, 194, 195, 525/211, 237, 360; 524/476, 484, 487

[56] References Cited

U.S. PATENT DOCUMENTS

| | | | |
|---|---|---|---|
| 3,758,643 | 9/1973 | Fischer | 260/897 A |
| 3,862,106 | 1/1975 | Fischer | 260/80.78 |
| 3,957,919 | 5/1976 | Von Bodungen et al. | 260/897 A |
| 4,104,210 | 8/1978 | Coran et al. | 260/4 R |
| 4,212,787 | 7/1980 | Matsuda et al. | 260/33.6 AQ |
| 4,247,652 | 1/1981 | Matsuda et al. | 521/95 |
| 4,593,062 | 6/1986 | Paydak et al. | 525/194 |
| 4,607,074 | 1/1986 | Hazelton et al. | 525/194 |
| 4,639,487 | 1/1987 | Hazelton et al. | 525/194 |
| 4,728,692 | 3/1988 | Sezaki et al. | 525/74 |
| 4,801,651 | 1/1989 | Komatsu et al. | 525/195 |

*Primary Examiner*—Carman J. Seccuro
*Attorney, Agent, or Firm*—Leydig, Voit & Mayer

[57] ABSTRACT

Thermoplastic elastomer having excellent processability and physical properties is provided by the composition:

(A) monoolefin copolymer rubber: 20 to 90 parts by weight
(B) crystalline poly-alpha olefin resin: 5 to 70 parts by weight
(C) mineral oil-type oil: 5 to 100 parts by weight with respect to (A) plus (B)
(D) polyolefin-type wax: 5 to 60 parts by weight with respect to (A) plus (B)
(E) butyl rubber: 0.1 to 10 parts by weight with respect to (A) plus (B)

in the extruder and then are dynamically partial cross-linked together with a certain amount of organic peroxide, cross-linking aids and coupling agents in the extruder.

9 Claims, No Drawings

THERMOPLASTIC ELASTOMERIC RESIN COMPOSITIONS AND PROCESS FOR PREPARING THE SAME

TECHNICAL FIELD

The present invention relates to a thermoplastic elastomeric resin composition and a process for preparing the same. Specifically, present invention relates to the thermoplastic elastomeric resin compositions which are prepared by adding organic peroxide and other organic or inorganic materials to a mixture of saturated or unsaturated monoolefin copolymer rubber with crystalline polyolefin resin to allow the partial cross-linking reaction in one or more steps, and the process for preparing thereof.

BACKGROUND OF THE INVENTION

In prior art, thermoplastic elastomers based on a mixture of saturated or unsaturated monoolefin copolymer rubber (EPM or EPDM) and crystalline polyolefin resin were described and have been prepared conventionally by dynamic partial curing of the mixture of rubber and resin.

For example, in U.S. Pat. Nos. 3758643 and 3862106 elastomers were prepared by partial cross-linking EPDM with peroxides and then blending with polyolefin; and in U.S. Pat. No. 3957919 elastomers were prepared by using EPDM and PP, PE, extender oil with peroxide, by means of a Brabender mixer in a batch system.

In addition, in U.S. Pat. No. 4104210 thermoplastic elastomers were prepared by dynamically cross-linking a rubber such as polybutadiene or nitrile rubber, SBR or polyisoprene, and a polyolefin resin with a curing agent. In U.S. Pat. Nos. 4212787 and 4247652 elastomers were prepared by using an olefin rubber, which is cross-linkable to peroxide, and a polyisobutylene rubber, which is not cross-linkable to peroxide, in a Banbary mixer.

Upon specifically classifying prior techniques as above, injection molding of rubber for preparing thermoplastic elastomer was carried out at an early stage by blending additives with the rubber, injecting the blend into a mold, and then cross-linking it.

However, this process entails disadvantages in that the mass production of rubber products is difficult due to the necessity of using a special molding machine, the long injection time and the need to carry out a number of complicated steps. Thus, in order to overcome such disadvantages the use of soft plastics, such as PVC, EVA and LDPE, which can be processed without cross-linking but which have properties similar to rubbers is suggested.

However, although these soft plastics have good processability and high flexibility, they have such drawbacks as low heat-resistance and low elasticity which limit their use. In addition, in order to increase the strength and heat-resistance of soft plastics, blending them with a resin having a high melting point such as HDPE or PP, has been done. This blending, however, also has many disadvantages, for example, in the thick part of the molded product sinkmarks are apt to occur because the blending causes a loss of fluidity. Accordingly, thermoplastic elastomers having properties which fall between those of cross-linked rubbers and soft plastics, have recently been developed.

Thus, in order to improve the wear resistance, tear resistance, and impact strength of olefin resins they have been blended with a rubber material. However, rubber has a lower fluidity than olefin resin and the compatibility of rubber with olefin resin is not so high. Consequently there are problems in the occurence of sinkmarks or flowmarks. Such problems become more significant if the olefin resins are blended with cured rubber.

As specific examples, the above U.S. Pat. Nos. 3758643 and 3862106 disclosed that the first rubber is cross-linked with organic peroxide or sulfur and in the next step polyolefin resin is added thereto and blended to prepare the thermoplastic elastomer. However, this process has disadvantages in that desirable properties such as elasticity, tensile strength, stiffness, surface hardness and heat distortion temperature are reduced, and particularly the thermoplastic elastomer has little or no fluidity and accordingly in a thick or large molded product flowmarks occur, and further, since the process is carried out via a batch system, the procedures are complicated and in a mass production the quality of products may be unstable depending upon the lot.

In addition, U.S. Pat. Nos. 4212787 and 4247652 disclose that thermoplastic elastomer was prepared by blending a cross-linkable rubber (EPM or EPDM) and a non cross-linkable rubber (e.g. polyisobutylene), which is not cross-linked with a cross-linking agent, together with a polyolefin resin in a Banbury mixer and then cross-linking them. The elastomer thus prepared has good physical properties. However, since the process is carried out by blending with a Banbury mixer and then treating with the cross-linking agent, the procedures are complicated, and further, since the process is carried out in a batch system there is again the danger of irregular quality in each lot.

Accordingly, the present invention solves the problems in the above conventional techniques wherein thermoplastic elastomer is prepared in a continuous system (i.e. one stage), not depending on the conventional batch system and multi-step process, and provides excellent processability and physical properties in a novel resin composition which includes special additives.

BRIEF DESCRIPTION OF THE INVENTION

The present invention provides a thermoplastic elastomer resin composition which comprises the basic composition of 20 to 90 parts by weight of a saturated or unsaturated monoolefin copolymer rubber (A), 5 to 70 parts by weight of a crystalline poly-alpha olefin resin (B), 5 to 100 parts by weight, with respect to (A)+(B), of a mineral oil-type oil (C), 5 to 60 parts by weight, with respect to (A)+(B), of an olefin-type wax (D) and 0.1 to 10 parts by weight, with respect to (A+B), of a butyl rubber (E), wherein on the basis of the total amount of the basic composition, 0.05 to 5 parts by weight of an organic peroxide, 0.1 to 2.0 parts by weight of a cross-linking aid and 0.01 to 5.0 parts by weight of a coupling agent are further added.

The present invention also provides a process for continuous preparation of thermoplastic elastomers in which a saturated or unsaturated monoolefin copolymer rubber, a crystalline poly-alpha olefin resin, a mineral oil-type oil, a polyolefin-type wax and a butyl rubber are blended in the mixing part of the compounding machine; the resulting blend is transferred through a hopper of the 4-vent type to a mixing zone which includes, twin screw extruder, consisting of at least three feed parts and at least three vent parts, and is melted and mixed; and subsequently upon introducing the meld blend into the second vent part, an organic peroxide, a cross-linking aid and a coupling agent are added thereto through the second feed part and the cross-linking reaction is proceeds; and then the unreacted materials are removed with a vacuum within the extruder system after which the additional additives such as heat-stabilizer, anti-oxidant, weather-proofing agent, anti-static agent and lubricant are added through another feed part and finally the blend is extruded from the extruder.

DETAILED DESCRIPTION OF THE INVENTION

In the present invention, the thermoplastic elastomer is prepared by dynamic partial curing a blend of saturated or unsaturated monoolefin copolymer rubber (EPM or EPDM type rubber) and crystalline polyolefin resin. The thermoplastic elastomer of the present invention has the following basis composition:

(A) monoolefin copolymer rubber: 20 to 90 parts by weight (B) crystalline poly-alpha olefin resin: 5 to 70 parts by weight (C) mineral oil-type oil: 5 to 100 parts by weight with respect to (A) plus (B)

(D) polyolefin-type wax: 5 to 60 parts by weight with respect to (A) plus (B)

(E) butyl rubber: 0.1 to 10 parts by weight with respect to (A) plus (B)

The thermoplastic elastomer is prepared by a process characterized in that the above-mentioned components are uniformly blended and then are dynamically partially cross-linked together with a certain amount of organic peroxide, cross-linking aids and coupling agents in the extruder.

As the monoolefin copolymer rubber employed in the present invention, ethylene-propylene copolymer rubber or ethylene-propylene-non-conjugated diene rubber is mainly used, wherein non-conjugated diene is bicyclo-pentadiene, 1,4-hexadiene or ethylene norbornene. When the rubber is cross-linked with organic peroxide, in order to avoid side reactions and to improve the efficiency of the cross-linking reaction a rubber having a high ethylene content, narrow molecular weight distribution and high diene content is preferred. The monoolefin copolymer rubber, which is preferred for the present invention, has the ethylene content of 60 to 90 percent by weight and Moony viscosity $ML_{1+4}$ (100° C.) of 10 to 120.

The crystalline poly-alpha olefin resin used in the present invention is preferably isotactic polypropylene, and copolymer of propylene and a small amount of other alpha olefin, such as propylene-ethylene copolymer, propylene-4-methyl-1-pentene copolymer, etc. The Melt Index (ASTM D 1238-65-T 230° C.) of the resin is preferably 0.6 to 60.

The mineral oil-type oil used in the present invention includes high boiling point petroleum fractions of aromatic, naphthenic or paraffinic bases, usually called "process oil". Preferably, the oil has a specific gravity of 0.87 to 1.02, a flow point of −40° C. to −10° C., an average molecular weight of 320 to 800 and a viscosity of 3 to 40 cst at 100° C. The mineral oil-type oil improves processability, promotes dispersion of carbon black and reduces the hardness of cured rubber so as to increase its flexibility and elasticity.

As the polyolefin-type wax, used in the present invention, polypropylene-type and polyethylene-type waxes are preferred, with those having a density of 0.91 to 0.99, a melt viscosity (125° C.) of 150 to 1500 cps and an average molecular weight of 1700 to 8000 being particular preferred. The polyolefin-type wax increases the compatibility of olefin copolymer rubber with crystalline polyolefin resin blend to bring out the effect of uniform dispersion of the rubber and gives a good surface brilliance of the final product and improves melt flow and mold releasing properties.

The butyl rubber employed in the present invention is required for providing the improvement in the appearance of the final product and the compatibility of the basic composition. The butyl rubbers having a Moony viscosity $ML_{1+8}$ (100° C.) of 30 to 60 and specific gravity of 0.92 are preferred.

The following components can be used as the organic peroxide for the present invention which is used for curing or decomposing rubber or plastic: aromatic diacyl peroxide, aliphatic diacyl peroxide, dibasic acid peroxide, ketone peroxide, dicumyl peroxide, di-tert.-butyl peroxide, 2,5-dimethyl-2,5-di-(tert.-butyl peroxy)-hexane, 2,5-dimethyl-2,5-di-(tert.-butyl peroxy)hexane-3, 1,3-bis(tert.-butyl peroxy isopropyl)benzene, 1,1-bis(-tert.-butyl peroxy)-3,3,5-trimethyl cyclohexane, n-butyl-4,4-bis(tert.-butyl peroxy)valerate, benzoyl peroxide, p-chlorobenzoyl peroxide, 2,4-dichlorobenzoyl peroxide, tert.-butyl perbenzoate, tert.-butyl peroxy-isopropyl carbonate, diacetyl peroxide, lauroyl peroxide, tert.-butylcumyl peroxide, diacetyl peroxide, dibenzoyl peroxide, bis-2,4-dichlorobenzoyl peroxide, 2,5-bis(-tert.-butyl peroxy)-2,5-dimethylhexane-3,4,4,4',4'-tetra-(tetra.-butyl peroxy)-2,2-dicyclohexylpropane.

Among the above-mentioned various organic peroxides, in view of oder and stability, 2,5-dimethyl-2,5-di(-tert-butyl peroxy)benzene, 2,5-dimethyl-2,5-di(tert.-butyl peroxy)hexane-3, 1,3-bis(tert.-butyl peroxy isopropyl)benzene, 1,1-bis(tert.-butyl peroxy)-3,3,5-trimethylcyclohexane, dicumyl peroxide, benzoyl peroxide, etc. are particularly effective.

In the present invention, the addition amount of the organic peroxide is preferably 0.05 to 5 parts by weight with respect to the total amount of (A+B+C+D+E). If the content of the organic peroxide is too small, the degree of cross-linkage of rubber is lowered and the heat-resistance, tensile strength and elastic recovery of the elastomer are reduced. If the content of the organic peroxide is too large, the fluidity of composite is reduced.

In carrying out a partial cross-linking by using the organic peroxide in the present invention, if a special cross-linking aid is used, the degradation of rubber caused by beta scission[a phenomenon of breakage of the beta-chain on EPDM rubber) is prevented and the degree of cross-linkage is uniform and therefore the mechanical properties of the elastomers are further improved.

The cross-linking aid which can be used in the present invention is a peroxy-cross linking promoter such as sulfur, p-quinone dioxime, p,p-dibenzoyl quinone dioxime, N-methyl-1,4-dinitrosoaniline, nitrobenzene, diphenyl guanidine or trimethylol propane-N,N'-m-phenylene dimaleimide, or a polyfunctional vinyl monomer such as divinyl benzene or triallyl cyanurate or a polyfunctional methacrylate monomer such as ethyleneglycol dimethacrylate, diethyleneglycol dimethacrylate, polyethyleneglycol dimethacrylate, trimethylol propane trimethacrylate or allyl methacrylate. The addition amount of the cross-linking aid is suitably 0.1 to 2.0 parts by weight with respect to the total amount of (A+B+C+D+E). If the amount of the cross-linking aid is small, dispersion of the organic peroxide is so poor that it does not provide uniform cross-linkage and this results in degradation of the quality of the product. On the other hand, if the addition amount of the aid is large, the cross-linking is overly induced and therefore the fluidity is reduced.

If a coupling agent is added in practicing the partial cross-linking reaction with the organic peroxide in the present invention, the processing becomes easier and the mechanical properties of elastomer are further improved. The coupling agents having the form of formula $(RO)_m\text{---}Ti\text{---}(O\text{---}XR^2\text{---}Y)_n$, wherein R is an alkyl radical, X is a carboxyl radical, a sulfonyl radical, a phosphato radical, —O—C—, or

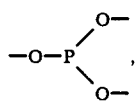

Y is —C=C, —NH$_2$ or —OH, and each of m and n is an integer and m+n is 4 to 6, are used and this will result in increase in the dispersibility of cross-linking agent and the degree of cross-linking as well as improvements in impact strength and processability. The addition amount of the coupling agent should be 0.01 to 5.0 parts by weight with respect to the total amount of (A+B+C+D+E). If the amount of coupling agent is too small, the effect of addition thereof does not appear, while if the amount of coupling agent is too large, the mechanical properties are impaired.

The preferred coupling agents in the present invention are isopropyl triisostearoyl titanate, isopropyl tri(-dioctyl-phosphato) titanate, titanium di(dioctylpyrophosphato)oxyacetate, diisostearol ethylene titanate, etc.

In the present invention, the addition of fillers to the thermoplastic elastomer composition will result in further improvement of the mechanical properties. The fillers which can be added to the elastomer composition include calcium carbonate, calcium silicate, clay, kaolin, talc, silica, mica, asbestos, alumina, barium sulfate, aluminum sulfate, glass fibers, glass beads, carbon fibers, etc. In addition, in the present invention various other heat-stabilizers, anti-oxidants, weather-proofing agents, anti-static agents, lubricants, etc., may be added.

The characteristic feature of the present invention resides in the process being carried out in one stage by utilizing an extruder of a specific type different from the conventional methods operating in complicated procedure of two or more stages utilizing a Banbury mixer or kneader. The extruder selected in the present invention is a twin screw extruder of a 4-vent type, which consists of at least three feed parts and at least three vent parts.

As to the type of screw, counter-rotating and co-rotating types both can be used. The extruder of the present invention is a specific extruder having a length to diameter ratio of at least 30.

According to the process for preparing the resin composition of the present invention in the aforementioned extruder, first, each of the monoolefin copolymer rubber (A), crystalline poly-alpha olefin resin (B), mineral oil-type oil (C), polyolefin-type wax (D) and butyl rubber (E) is prepared and then these components are blended together by a dry blend or supermixer. This blend is fed to a hopper of the extruder and mixed uniformly in a mixing zone. In this process, if the temperature is high, the difference of torques operating in the extruder between the monoolefin copolymer rubber and the crystalline poly-alpha olefin resin is great and this will result in unsatisfactory blending and decrease of the blending effect. Accordingly, it is important that great share is provided and the temperature is maintained at 180° to 230° C.

After completing the intimate blending in the mixing zone, the melt blend is introduced into the second vent part and then the aforementioned organic peroxide, cross-linking aid and coupling agent are added to the extruder through the second feed part, whereby the cross-linking reaction proceeds. Since the unreacted reactants in the extruder are preferably removed, the interior of the system must be maintained at a perfect vacuum. In addition, as final additives heat-stabilizers, anti-oxidants, weather-proofing agents, anti-static agents, and lubricants(metal soap) containing Zn, Mg, Ca components are added through another feed part to produce the final product.

The effect of the present invention as mentioned above resides in providing a continuous process for totally improving the complexity of procedures and the ununiformity of quality of the final product in the conventional batch-type or multi-step process, whereby the product having good properties can be stably produced. The present invention will be further illustrated in detail with reference to the examples given below.

EXAMPLES

The present invention will be further described in detail in the following, but it should be noted that the invention is not limited to these examples.

In these examples, the machine and test conditions are as follows.

| | |
|---|---|
| Injection Molding Machine | made by Toshiba Machinery Co., Ltd. |
| Molding Temperature | 200° C. |
| Injection Pressure | primary pressure 140 kg/cm$^2$, secondary pressure 100 kg/cm$^2$ |
| Basic Properties | |
| Tensile strength and Break strength (kg/cm$^2$) | according to KSM6518 (elongation rate 200 mm/min.) |
| Elongation (%) | according to KSM 6518 (elongation rate 200 mm/min. |
| Hardness | Rockwell R hardness ASTM-D-785 |
| Melt Index | according to ASTM D 1505 (temperature 230° C.; load 2.16 kg) |
| Density | according to ASTM D 1505 |
| Flexural modulus | according to KSM 6518 at a rate of 2 mm/min. |

| Izod impact strength | according to ASTM D 256 |

The tests are carried out on test pieces 24 hours or more after the molding and further 3 hours or more after preservation under standard laboratory conditions.

The materials used in the examples are referred by the following abbreviations:

3 minutes. The test piece is generally prepared from a screw-type injection molding machine.

The detailed results of Examples 1 through 5 are shown in Table 1.

TABLE 1

|  | Examples | | | | | | | | | |
|---|---|---|---|---|---|---|---|---|---|---|
|  | 1 | 2 | 3 | 4 | 5 | 6 | 7 | 8 | 9 | 10 |
| EPDM I | 70 | 60 | 50 | 40 | 30 | 70 | 60 | 50 | 40 | 30 |
| PP I | 30 | 40 | 50 | 60 | 70 | 30 | 40 | 50 | 60 | 70 |
| Peroxide A | — | — | — | — | — | 0.3 | 0.3 | 0.3 | 0.3 | 0.3 |
| 100% Tensile Strength | 105 | 120 | 140 | 160 | 180 | 65 | 80 | 100 | 120 | 130 |
| Break Strength | 110 | 130 | 150 | 200 | 220 | 95 | 110 | 140 | 160 | 170 |
| Elongation | 180 | 165 | 150 | 120 | 70 | 650 | 640 | 640 | 600 | 600 |
| Impact Strength |  |  |  |  |  |  |  |  |  |  |
| normal temp. | NB | NB | NB | NB | B | NB | NB | NB | NB | NB |
| −20° C. | NB | NB | NB | B | B | NB | NB | NB | NB | B |
| Rockwell R | 70 | 90 | 105 | 120 | 125 | 65 | 90 | 105 | 120 | 140 |

In the above Table, B means "break" and NB means "no break"

| EPDM I | ethylene-propylene ethylidene norbornene copolymer rubber, Mooney viscosity $ML_{1+4}$ (127° C.) 45 |
| EPDM II | ethylene-propylene ethylidene norbornene copolymer rubber, Mooney viscosity $ML_{1+4}$ (100° C.) 88 |
| EPDM III | ethylene-propylene ethylidene norbornene copolymer rubber, ethylene content 65% |
| EPM I | ethylene-propylene copolymer rubber, Mooney viscosity $ML_{1+4}$ (100° C.) 70 |
| EPM II | ethylene-propylene copolymer rubber, Mooney viscosity $ML_{1+4}$ (100° C.) 24 |
| BR | Butyl rubber (Exxon Butyl 268 produced by Exxon Chemical Co.), Mooney viscosity $ML_{1+4}$ (100° C.) 49 |
| PP I | polypropylene, Melt Index (ASTM D1238-65T, 230° C.) 8, density 0.9 g/cm$^3$ |
| PP II | polypropylene, Melt Index (ASTM D1238-65T, 230° C.) 14 |
| PP III | ethylene-propylene copolymer, Melt Index (ASTM D1238-65T, 230° C.) 1.5 |
| PP IV | ethylene-propylene copolymer, Melt Index (ASTM D1238-65T, 230° C.) 4.0 |
| LDPE I | low density polyethylene, Melt Index (ASTM D 1238-65T, 190° C.) 24, density 0.915 g/cm$^3$ |
| LDPE II | low density polyethylene, Melt Index (ASTM D 1238-65T, 190° C.) 6.0, density 0.920 g/cm$^3$ |
| HDPE I | high density polyethylene, Melt Index (ASTM D 1238-65T, 190° C.) 5, density 0.963 g/cm$^3$ |
| HDPE II | high density polyethylene, Melt Index (ASTM D 1238-65T, 190° C.) 6, density 0.968 g/cm$^3$ |
| PEW | polyethylene wax (L-C 502NC made by Lion Chemical), density 0.935 g/cm$^3$, average molecular weight 3000 |
| PPW | Polypropylene wax (L-C 102N made by Lion Chemical), density 0.89 g/cm$^3$, average molecular weight 4750 |
| Oil I | naphthenic process oil (Han Il Oil Refinery Co., Ltd., N Grade) |
| Oil II | paraffinic process oil (Han IL Oil Refinery Co., Ltd., P Grade |
| Peroxide A | dicumyl peroxide |
| Peroxide B | benzoyl peroxide |
| TPT | trimethylol propane trimethacrylate |
| TCI | triallyl cyanurate |
| CB | carbon black |
| Irganox | anti-oxidant Irganox 1010 (Ciba-Geigy) |
| KA 101 | isopropyl tri(dioctyl phosphate)titanate |

In the following examples, all the parts are based on the weight unless otherwise indicated.

EXAMPLES 1 THROUGH 5

EPDM I and PP I are blended, from which the thermoplastic elastomer is prepared using the extruder. The reaction temperature is 200 C. and the retention time is

EXAMPLES 6 THROUGH 10

EPDM I and PP I are blended and then Peroxide A is added thereto. The reaction conditions are identical to those of Examples 1 through 5. The detailed results of tests are the same as Table 1.

EXAMPLES 11 THROUGH 14

EPM I or EPDM I and PP I and PPW are blended and then Peroxide A and TPT are added thereto. The reaction conditions are identical to those of Examples 1 through 5. The detailed results of tests are shown in Table 2.

TABLE 2

|  | Examples | | | |
|---|---|---|---|---|
|  | 11 | 12 | 13 | 14 |
| EPM I | — | — | 43 | 47 |
| EPDM I | 43 | 47 | — | — |
| PP I | 57 | 53 | 57 | 53 |
| PPW | 10 | 10 | 10 | 10 |
| Peroxide A | 0.3 | 0.3 | 0.3 | 0.3 |
| TPT | 0.2 | 0.2 | 0.2 | 0.2 |
| 100% Tensile Strength | 114 | 110 | 105 | 100 |
| Break Strength | 146 | 140 | 130 | 115 |
| Elongation | 650 | 660 | 650 | 650 |
| Impact Strength |  |  |  |  |
| normal temp. | NB | NB | NB | NB |
| −20° C. | B | NB | B | B |
| Rockwell R | 115 | 110 | 106 | 98 |

EXAMPLES 15 THROUGH 18

PPI, EPDM I and PEW are blended together and then Peroxide A is added. The reaction conditions are identical to those of Examples 1 through 5. The detailed results of the tests are shown on Table 3.

TABLE 3

|  | Examples | | | |
|---|---|---|---|---|
|  | 15 | 16 | 17 | 18 |
| PP I | 55 | 55 | 55 | 55 |
| EPDM I | 45 | 45 | 45 | 45 |
| PEW | 10 | 10 | 10 | 10 |
| Peroxide A | — | 0.3 | 0.5 | 0.8 |
| 100% Tensile Strength | 125 | 105 | 106 | 108 |
| Break Strength | 140 | 130 | 150 | 210 |
| Elongation | 130 | 680 | 670 | 670 |
| Impact Strength |  |  |  |  |
| normal temp. | NB | NB | NB | NB |
| −20° C. | B | NB | NB | B |
| Rockwell R | 101 | 105 | 108 | 108 |

EXAMPLES 19 THROUGH 23

PP I, EPDM I, and HDPE I or HDPE II are blended together and then Peroxide A is added. The reaction conditions are identical to those of Examples 1 through 5. The detailed results of the tests are shown on Table 4.

TABLE 4

|  | Examples | | | | |
|---|---|---|---|---|---|
|  | 19 | 20 | 21 | 22 | 23 |
| PP I | 57 | 57 | 57 | 57 | 57 |
| EPDM I | 43 | 38 | 38 | 38 | 38 |
| HDPE I | — | 5 | 10 | — | — |
| HDPE II | — | — | — | 5 | 10 |
| Peroxide A | 0.5 | 0.5 | 0.5 | 0.5 | 0.5 |
| 100% Tensile Strength | 103 | 118 | 120 | 119 | 121 |
| Break Strength | 130 | 150 | 178 | 156 | 180 |
| Elongation | 650 | 660 | 655 | 700 | 710 |
| Impact Strength |  |  |  |  |  |
| normal temp. | NB | NB | NB | NB | NB |
| −20° C. | NB | NB | B | NB | B |
| Rockwell R | 121 | 135 | 141 | 141 | 142 |

EXAMPLES 24 THROUGH 29

EPDM I, and PP I or PP III or PP IV, and Oil II are blended together and then Peroxide A is added. The reaction conditions are identical to those of Examples 1 through 5. The detailed results of tests are shown on Table 5.

TABLE 5

|  | Examples | | | | | |
|---|---|---|---|---|---|---|
|  | 24 | 25 | 26 | 27 | 28 | 29 |
| PP I | 30 | 40 | — | — | — | — |
| PP III | — | — | 30 | 40 | — | — |
| PP IV | — | — | — | — | 30 | 40 |
| EPDM I | 70 | 60 | 70 | 60 | 70 | 60 |
| Oil II | 15 | 15 | 15 | 15 | 15 | 15 |
| Peroxide A | 0.3 | 0.3 | 0.3 | 0.3 | 0.3 | 0.3 |
| 100% Tensile Strength | 70 | 90 | 60 | 63 | 65 | 78 |
| Break Strength | 128 | 148 | 100 | 130 | 105 | 135 |
| Elongation | 680 | 670 | 675 | 660 | 650 | 660 |
| Impact Strength |  |  |  |  |  |  |
| normal temp. | NB | NB | NB | NB | NB | NB |
| −20° C. | NB | NB | NB | NB | NB | NB |
| Rockwell R | 74 | 70 | 65 | 78 | 67 | 80 |

EXAMPLES 30 THROUGH 31

PP I, EPDM I, Oil I or Oil II, HDPE I, and carbon black are blended in a supermixer and then Peroxide A is added. Further, anti-oxidant is added. The reaction conditions are identical to those of Examples 1 through 5. The detailed results of the tests are shown on Table 6.

COMPARATIVE EXAMPLE 1

PP I, EPDM I, Oil I or Oil II, HDPE I and carbon black are blended at 200° C. in a Banbary mixer for 5 minutes at a rate of 100 rpm. Then, Peroxide A is added to react for 3 minutes and then anti-oxidant is added to react for 3 minutes. The detailed results of the tests are shown on Table 6.

TABLE 6

|  | Examples | | Comparative Example |
|---|---|---|---|
|  | 30 | 31 | 1 |
| PP I | 53 | 53 | 53 |
| EPDM I | 30 | 30 | 30 |
| Oil I | 13 | — | 13 |
| Oil II | — | 13 | — |
| HDPE I | 5 | 5 | 5 |
| CB | 1 | 1 | 1 |
| Peroxide A | 0.5 | 0.5 | 0.5 |
| Irganox | 0.2 | 0.2 | 0.2 |
| 100% Tensile Strength | 110 | 100 | 103 |
| Break Strength | 130 | 114 | 118 |
| Elongation | 660 | 660 | 650 |
| Impact Strength |  |  |  |
| normal temp. | NB | NB | NB |
| −20° C. | B | B | B |
| Rockwell R | 120 | 117 | 115 |

EXAMPLES 32 THROUGH 36

PP I and PP II, EPDM I, Oil I, PPW, BR and carbon black are blended in a supermixer and then Peroxide A, TCI and KA 101 are added thereto. The reaction conditions are identical to those of Examples 1 through 5. The detailed results of the tests are shown on Table 7.

TABLE 7

|  | Examples | | | | |
| --- | --- | --- | --- | --- | --- |
|  | 32 | 33 | 34 | 35 | 36 |
| PP I | 45 | 45 | 45 | 45 | 45 |
| PP II | 15 | 15 | 15 | 15 | 15 |
| EPDM I | 40 | 40 | 40 | 40 | 40 |
| Oil I | 5 | 10 | 15 | 20 | 20 |
| PPW | 10 | 10 | 10 | 10 | 10 |
| CB | 2 | 2 | 2 | 2 | 2 |
| Peroxide A | 0.5 | 0.5 | 0.5 | 0.5 | 0.5 |
| BR | — | — | — | — | 5 |
| TCI | — | — | — | — | 0.2 |
| KA 101 | — | — | — | — | 0.3 |
| 100% Tensile Strength | 130 | 130 | 125 | 120 | 140 |
| Break Strength | 140 | 145 | 140 | 140 | 155 |
| Elongation | 700 | 690 | 690 | 680 | 720 |
| Impact Strength |  |  |  |  |  |
| normal temp. | NB | NB | NB | NB | NB |
| −20° C. | NB | NB | NB | NB | NB |
| Rockwell R | 110 | 120 | 110 | 120 | 125 |

EXAMPLES 37 THROUGH 39

PP II or PP IV, EPM II, EPM III and BR are blended together and then Peroxide B, TPT and KA 101 are added thereto. The reaction conditions are identical to those of Examples 1 through 5. The detailed results of the tests are shown on Table 8.

TABLE 8

|  | Examples | | |
| --- | --- | --- | --- |
|  | 37 | 38 | 39 |
| PP II | 60 | — | 30 |
| PP IV | — | 60 | 30 |
| EPM II | 40 | 60 | 20 |
| EPM III | — | 10 | 20 |
| BR | 5 | 5 | 5 |
| Peroxide B | 0.3 | 0.3 | 0.3 |
| TPT | 0.2 | 0.2 | 0.2 |
| KA 101 | 0.3 | 0.3 | 0.3 |
| 100% Tensile Strength | 115 | 113 | 110 |
| Break Strength | 135 | 130 | 135 |
| Elongation | 680 | 690 | 680 |
| Impact Strength |  |  |  |
| normal temp. | NB | NB | NB |
| −20° C. | NB | NB | NB |
| Rockwell R | 115 | 120 | 120 |

We claim:

1. A thermoplastic elastomer resin composition which comprises the basic composition of 20 to 90 parts by weight of a saturated or unsaturated monoolefin copolymer rubber (A), 5 to 70 parts by weight of a crystalline polyalpha olefin resin (B), 5 to 100 parts by weight, with respect to (A)+(B), of a mineral oil-type oil (C), 5 to 60 parts by weight, with respect to (A)+(B), of an olefin-type wax (D) and 0.1 to 10 parts by weight, with respect to (A+B), of a butyl rubber (E), wherein on the basis of the total amount of the basic composition, 0.05 to 5 parts by weight of an organic peroxide, 0.1 to 2.0 parts by weight of a cross-linking aid and 0.01 to 5.0 parts by weight of a coupling agent are further added.

2. The resin composition according to claim 1, wherein the said saturated or unsaturated monoolefin copolymer rubber is ethylene-propylene copolymer rubber or ethylene-propylene-non-conjugated diene rubber, which has an ethylene content of 60 to 90 wt. % and a Mooney viscosity $ML_{1+4}$ (100° C.) of 10 to 100.

3. The resin composition according to claim 1, wherein the said crystalline poly-alpha olefin resin is isotactic polypropylene, propylene-ethylene copolymer or propylene-4-methyl-1-pentene copolymer, which has a Melt Index of 0.6 to 60.

4. The resin composition according to claim 1, wherein the said mineral oil-type oil is aromatic, paraffinic or naphthenic oil.

5. The resin composition according to claim 1, wherein the said olefin-type wax is polyethylene wax or polypropylene wax, which has an average molecular weight of 1700 to 8000.

6. The resin composition according to claim 1, wherein the said butyl rubber has a Mooney viscosity $ML_{1+8}$ (100° C.) of 30 to 60.

7. The resin composition according to claim 1, wherein the said organic peroxide is 2,5-dimethyl-2,5-di(tert.-butyl peroxy)benzene, 2,5-dimethyl-2,5-di(tert.-butyl peroxy)hexane-3, 1,3-bis(tert.-butyl peroxy isopropyl)benzene, 1,1-bis(tert.-butyl peroxy)-3,5,5-trimethylcyclohexane, dicumyl peroxide or benzoyl peroxide.

8. The resin composition according to claim 1, wherein the said cross-linking aid is polyfunctional vinyl monomer or polyfunctional methacrylate.

9. The resin composition according to claim 1, wherein the said coupling agent is isopropyl triisostearoyl titanate, isopropyl tri(dioctyl phosphato) titanate, titanium di(dioctylpyrophosphate)oxyacetate, or diisostearol ethylene titanate.

* * * * *

UNITED STATES PATENT AND TRADEMARK OFFICE
CERTIFICATE OF CORRECTION

PATENT NO. : 4,912,148

DATED : March 27, 1990

INVENTOR(S) : Kim et al.

It is certified that error appears in the above-identified patent and that said Letters Patent is hereby corrected as shown below:

On the title page:

In item [54], change the title from "THERMOPLASTIC ELASTOMERIC RESIN COMPOSITIONS AND PROCESS FOR PREPARING THE SAME" to --THERMOPLASTIC ELASTOMERIC RESIN COMPOSITIONS--.

In item [57], in the Abstract, lines 14-17, delete the text "in the extruder and then are dynamically partial cross-linked together with a certain amount of organic peroxide, cross-linking aids and coupling agents in the extruder".

Signed and Sealed this

Twenty-seventh Day of August, 1991

Attest:

HARRY F. MANBECK, JR.

Attesting Officer

Commissioner of Patents and Trademarks